US008823810B2

(12) United States Patent
Mistretta et al.

(10) Patent No.: US 8,823,810 B2
(45) Date of Patent: *Sep. 2, 2014

(54) VISION SYSTEM AND METHOD FOR MOTION ADAPTIVE INTEGRATION OF IMAGE FRAMES

(71) Applicant: Wisconsin Alumni Research Foundation, Madison, WI (US)

(72) Inventors: Charles Mistretta, Madison, WI (US); Justin Mertes-Mistretta, Middleton, WI (US); Erick Oberstar, Madison, WI (US); Ethan Brodsky, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/938,521

(22) Filed: Jul. 10, 2013

(65) Prior Publication Data
US 2013/0300883 A1     Nov. 14, 2013

Related U.S. Application Data

(63) Continuation of application No. 12/538,433, filed on Aug. 10, 2009, now Pat. No. 8,497,914.

(51) Int. Cl.
*H04N 5/228* (2006.01)
*G06T 5/00* (2006.01)

(52) U.S. Cl.
CPC ....... *G06T 5/002* (2013.01); *G06T 2207/20182* (2013.01); *G06T 2207/10048* (2013.01)
USPC .................... 348/208.4; 348/216.1; 348/158; 348/164

(58) Field of Classification Search
CPC ............ G06T 5/50; G06T 2207/20182; G06T 2207/10048
USPC .......... 348/208.4, 208.5, 208.6, 216.1, 217.1, 348/168, 162, 164
See application file for complete search history.

(56) References Cited

U.S. PATENT DOCUMENTS 5,442,407 A    8/1995  Iu
(Continued)

OTHER PUBLICATIONS

McIvor et al., The Background Subtraction Problem for Video Surveillance Systems, pp. 176-183, 2001.
Adirondack Video Astronomy, Adirondack Flat Field Users Manual [online], 2005. Retrieved from the Internet: <URL: http://www.astrovid.com/technical_documents/AVAflatfielder.pdf>.

(Continued)

*Primary Examiner* — David Lazaro
(74) *Attorney, Agent, or Firm* — Quarles & Brady, LLP

(57) ABSTRACT

A night vision device and method for filtering a series of image frames that depict a moving subject, which thereby improves the signal-to-noise ratio of each image frame, is provided. A composite image is formed for each image frame by combining pixel values in a current image frame with pixel values in composite images corresponding to image frames acquired before the current image frame. Additionally, pixels values in image frames acquired subsequent to the acquisition of the current image frame are included when forming the composite image. A bi-directional recursive filter is used to weight the contributions from the previous composite images and subsequent image frames with a decay constant. Motion of the imaging system is optionally compensated for by establishing a moving reference frame and shifting the image frames to account for this motion; thus, registering the image frames before filtering the current image frame.

7 Claims, 9 Drawing Sheets

(56) References Cited

U.S. PATENT DOCUMENTS

| | | | |
|---|---|---|---|
| 5,798,948 | A | 8/1998 | Rashkovskiy et al. |
| 6,373,055 | B1 | 4/2002 | Kerr |
| 6,442,203 | B1 | 8/2002 | Demos |
| 6,707,044 | B2 | 3/2004 | Lannestedt et al. |
| 7,103,235 | B2 | 9/2006 | Tener et al. |
| 7,110,035 | B1 | 9/2006 | Hellstrand |
| 7,128,705 | B2 | 10/2006 | Brendley et al. |
| 7,336,823 | B2 | 2/2008 | Guldevall |
| 7,340,162 | B2 | 3/2008 | Terre et al. |
| 7,391,450 | B2 | 6/2008 | Pinto et al. |
| 2002/0101510 | A1 | 8/2002 | Basson |
| 2002/0159651 | A1 | 10/2002 | Tener et al. |
| 2004/0252199 | A1 | 12/2004 | Cheung et al. |
| 2009/0022410 | A1 | 1/2009 | Haskell |

OTHER PUBLICATIONS

Bolte, Signal-to-Noise in Optical Astronomy [online], 2006. Retrieved from the Internet: <URL: http://www.ucolick.org/~bolte/AY257/s_n.pdf>.

Gardner, Characterizing Digital Cameras with the Photon Transfer Curve [online], 2008. Retrieved from the Internet: <URL: http://www.couriertronics.com/docs/notes/cameras_application_notes/Photon_Transfer_Curve_Charactrization_Method.pdf>.

Heap and Brown, Correction for the STIS Echelle Blaze Function, pp. 114-119, 1997.

Tulloch, Design and Use of a Novel Flat Field Illumination Light Source, 1996.

Robinson, Determining the Vignetting and Echelle Blaze Function for the GHRS, pp. 291-303, 1993.

Kirschman, et al., Flat-field calibration of CCD detector for Long Trace Profiler, Proc. SPIE, vol. 6704, 2007.

VISION SYSTEM AND METHOD FOR MOTION ADAPTIVE INTEGRATION OF IMAGE FRAMES

CROSS-REFERENCE TO RELATED APPLICATIONS

This application is a continuation of U.S. application Ser. No. 12/538,433, filed Aug. 10, 2009 now U.S. Pat. No. 8,497,914, which issued on Jul. 30, 2013.

STATEMENT REGARDING FEDERALLY SPONSORED RESEARCH

This invention was made with government support under EB006393 awarded by the National Institutes of Health. The government has certain rights in the invention.

BACKGROUND OF THE INVENTION

The field of the invention is vision systems that acquire and display a series of image frames, and particularly, vision systems such as those used to enhance night vision.

Night vision systems employ cameras that are sensitive to wavelengths such as infrared ("IR"). The image frames that are produced may be displayed alone in sequence to provide a moving picture of a night-time scene captured by the camera, or the IR image frames may be combined with image frames acquired at optical wavelengths to enhance the optical image frames.

Night vision systems typically employ heavy image intensifier systems. Although image intensifiers can increase brightness and provide modest improvements in detected signal-to-noise ratio ("SNR") through amplification or spectral changes in the light incident on a detector, they cannot improve on the SNR provided by the light emanating from the low-light-level scene. Thus, such vision systems characteristically produce images having a high noise content. These vision systems are also characterized by difficulties in depicting moving subjects and a changing scene that results from panning of the vision system, for example, from head motion. Such motion makes it difficult to filter noise from the image frames without losing significant information.

It would therefore be desirable to provide a lightweight, optionally non-intensified, system for night vision having an improved signal-to-noise ratio ("SNR") without the loss of significant information in the image. Additionally, it would be desirable to provide a method for enhancing the visualization of static and moving objects in low light conditions.

SUMMARY OF THE INVENTION

The aforementioned drawbacks are overcome by the present invention, which provides a method for displaying images to a user using motion adaptive frame integration with real time digital processing and display. This allows for a lightweight, usually non-intensified, imaging system for night vision.

The present invention is a method for filtering a series of image frames that depict a moving subject, which thereby improves the signal-to-noise ratio ("SNR") of each image frame. More specifically, a filtered, or "composite," image is formed by combining, or "integrating," pixel values in a current image frame with pixel values in previously processed image frames (that is, previously produced composite images) and pixels values in image frames acquired subsequent to the acquisition of the current image frame. This is achieved using a so-called bi-directional recursive filter, in which the contributions from the previous composite images and subsequent image frames to the filtering of the current image frame are weighted with a decay constant. Motion of the imaging system is compensated for by establishing a moving reference frame indicative of the moving imaging system and shifting the image frames to account for this bulk motion, or "panning." Thus, the pixels in the image frames are registered to the same pixel locations before filtering the current image frame.

It is an aspect of the invention to provide a method for further processing a series of image frames that depict a moving subject such that motion that occurs within the image scene is compensated. For example, when the image scene corresponds to one that would be seen from a moving vehicle, substantially every portion of each image frame is moving at different rates in the image scene. To this end, each image frame is first transformed into the moving reference frame of the imaging system and then motion correction parameters associated with motion occurring within the image scene are determined. In this manner, each image frame is compensated for parallax and the variable speeds with which objects move through the scene.

It is another aspect of the invention to provide a method for filtering a series of image frames that depict a moving subject, which thereby improves the signal-to-noise ratio ("SNR") of each image frame. More specifically, a filtered, or "composite," image is formed by combining, or "integrating," pixel values in a current image frame with pixel values in previously processed image frames (that is, previously produced composite images) and pixels values in image frames acquired subsequent to the acquisition of the current image frame. This is achieved using a so-called bi-directional recursive filter, in which the contributions from the previous composite images and subsequent image frames to the filtering of the current image frame are weighted with a decay constant. Moreover, at least some of the previous composite image frames and subsequent image frames are masked such that only the substantially static portions of these image frames are included in the composite image. The non-masked image frames are weighted with a first decay constant before combining them in the filtering operation and the masked image frames are weighted with a second decay constant before combining them in the filtering operation. This further incorporation of information into the current composite image frame being produced provides a corresponding further increase in SNR in the composite image.

It is yet another aspect of the invention to provide a method for filtering and displaying an image to a user with an imaging device, in which the filtered image has a significantly higher signal-to-noise ratio ("SNR") than any single image frame acquired with the imaging system. This filtering is achieved by combining, or integrating, pixel values with a method that accounts for complications arising from situations where the imaging system is panning a scene and objects within the scene are moving.

It is yet another aspect of the invention to provide a method for enhancing and displaying an image to a user with an imaging device, in which the enhanced image identifies pixels in the image that are indicative of objects moving within the scene. A motion mask is produced by first establishing a moving reference frame indicative of the motion of the imaging system, and then transforming the acquired image frames into the moving reference frame. In effect, this registers the series of image frames with each other. The motion mask is produced by comparing temporally adjacent image frames and thresholding the comparison to identify those pixels that differ from one image frame to the next. A binary mask is produced using these identified pixels and is then temporally and spatially dilated to expand the region of pixels included in the mask. This mask is then convolved and normalized to blur the edges of the identified pixel regions. The acquired image frames are then enhanced using this produced motion mask. Enhancement occurs by producing a motion image for each image frame by multiplying each image frame by the corresponding motion mask. A static mask is then produced by subtracting the motion mask from a matrix of ones. This static mask is applied to the corresponding composite image frame to produce a "static image frame." The static and motion image frames are then added together to produce a motion enhanced image frame.

The motion and static image frames are essentially different channels of the enhanced motion image frame, and these channels can be altered to produce different contrast therebetween. For example, the colormap of the motion image can be altered such that the motion image is highlighted with red, while the static image can retain a grayscale colormap. Thus, the motion enhanced images presented to the user will indicate those regions indicative of motion occurring within the scene as highlighted in red.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1A:
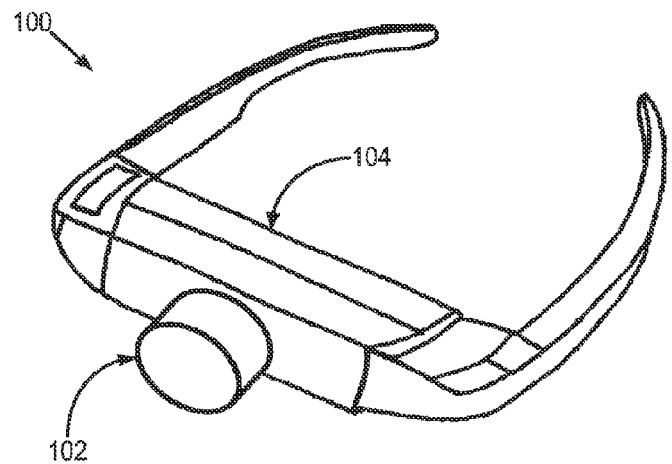
FIG. 1A depicts an exemplary imaging system, which may employ the present invention.

Referring particularly to FIG. 1A, an exemplary imaging system 100 employed when practicing the present invention is shown. The imaging system 100, such as one configured to operate as a night vision device ("NVD"), includes an optical assembly 102 that is attached to a display system housing 104. The optical assembly 102 includes, for example, a monocular or binocular arrangement of lenses coupled to a image array (not shown). The use of a magnification lens in the optical assembly 102 is also optional. The display housing 104 forms a part of a goggle system that is configured to be worn by a user in a manner similar to a pair of eyeglasses. The display housing 104 contains at least one display device (not shown), such as a liquid crystal display ("LCD") or an organic light emitting diode ("OLED") display panel; however, when a binocular optical assembly is employed, images may be viewed in stereo with two separate displays, one for each of the user's eyes.

Figure 2:
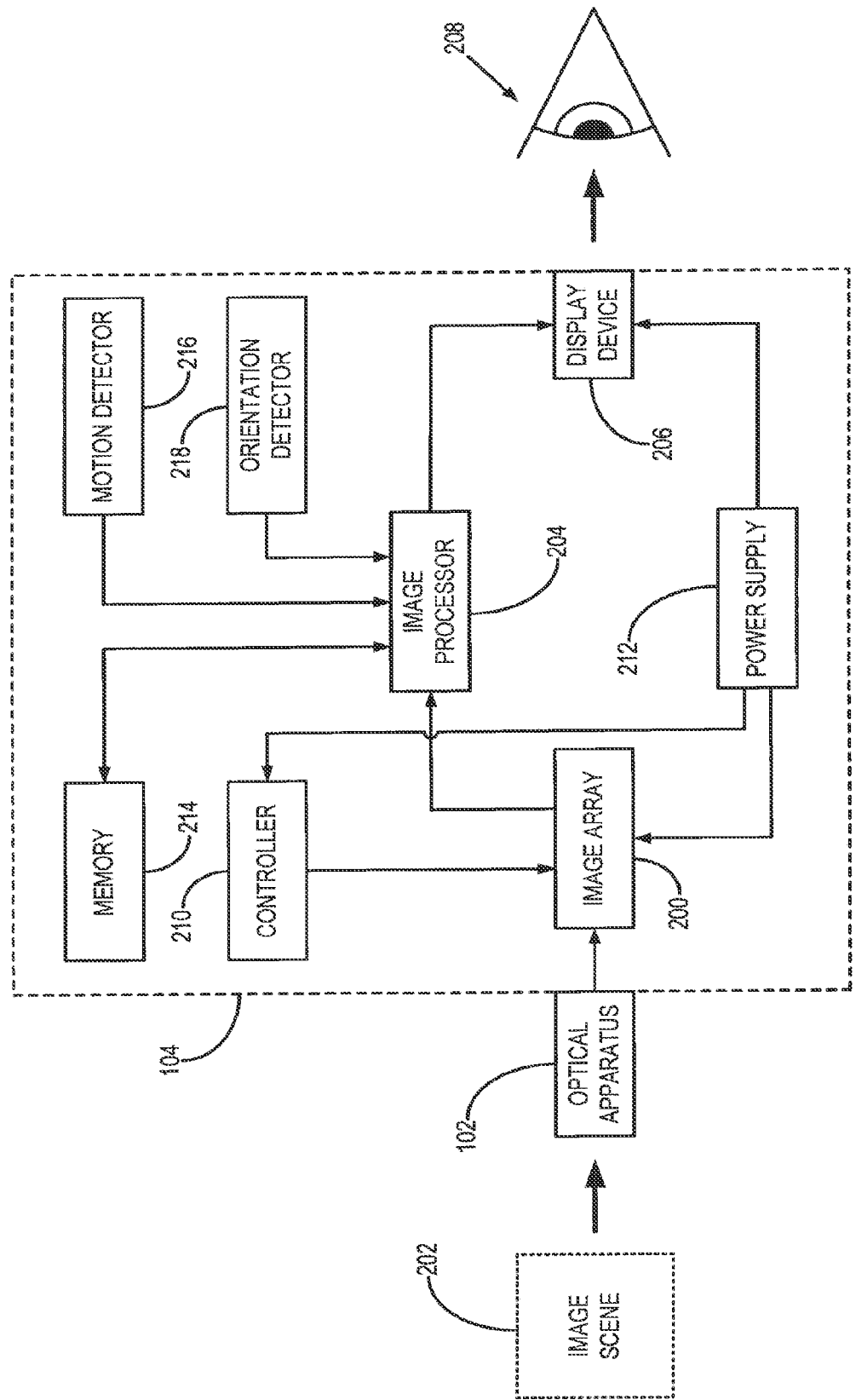
FIG. 2 is a block diagram of the imaging system of FIG. 1A.

Referring now particularly to FIG. 2, an exemplary configuration of the imaging system 100, in which image processing hardware, control hardware, and a power supply are integrated into the display housing 104 of the imaging system 100, is shown in a block diagram. This configuration includes an image array 200 that is coupled to the optical assembly 102. The optical assembly 102 and image array 200 are coupled to each other, for example, by a fused fiber optic bundle. The image array 200 senses light from a scene 202 and creates a real-time video signal that contains an electronic image of the scene 202. The input to the image array 200 is, therefore, the image scene light, which may be quite low in night-time operations. In an alternative configuration, an image intensifier, such as a so-called third generation image intensifier, is disposed between the optical assembly 102 and image array 200. Exemplary image arrays 200 include a charge-coupled device ("CCD"), complimentary metal-oxide semiconductor ("CMOS"), and focal plane array ("FPA") image sensor system.

The video signal produced by the image array 200 is transmitted to the image processor 204, which receives and processes the video signal in accordance with the present invention. The processed video signal is then communicated to the display device 206, which receives the processed video signal and generates a two dimensional image that can be viewed by the user's eye 208. Exemplary display devices include flat panel microdisplays, which typically measure less than 1.5 inches diagonally. Such microdisplays include emissive, reflective, and transmissive displays. Emissive displays are preferred for the present configuration since they offer the greatest power efficiency; however, reflective and transmissive display types can similarly be employed. Exemplary emissive displays include light emitting diode ("LED") and organic LED ("OLED") display panels, while exemplary reflective and transmissive displays include a reflective surface and backlit liquid crystal display ("LCD") panels, respectively.

A system controller 210 is communicatively connected to the image array 200. The system controller 210 includes, for example, field-programmable gate array ("FPGA") logic gates that direct the image array 200 to operate in a number of different modes.

The image array 200, system controller 210, and video display device 206 receive electrical energy from a power source 212. Exemplary power sources 212 include batteries, such as one or more "AA" type batteries, or a rechargeable battery system. Exemplary rechargeable battery systems include thin film rechargeable lithium batteries, lithium ion batteries, and high efficiency nano-structured solid-state composite batteries, such as those with a lithium-based cathode and a silicon nanowire coated carbon-black or stainless steel anode.

The image processor 204 provides the capability of performing real-time image processing of the video signal for the purpose of enhancing the picture presented to the user in accordance with the present invention. The image processor 204 is communicatively connected to a system memory 214, such as, for example, random access memory ("RAM"). The memory 214 provides a buffer in which image data is stored as the image processor 204 performs its functions. The image processor also optionally receives motion and orientation information from an integrated motion detector 216 and orientation detector 218. Exemplary motion detectors include three-axis accelerometers, while exemplary orientation detectors include three-axis gyroscopes and three-axis compasses. The information provided to the image processor 204 by these detectors significantly improves the computational efficiency of the image processing methods described herein. However, the information provided by these detectors is not necessary when practicing the present invention. The image processor 204 also carries out conventional image processing functions, such as, for example: contrast stretching, edge detection and enhancement, aperture correction, and mixing of video channel information.

Exemplary image processors include: one or more low power microcontroller units ("MCU"), such as ARM MCUs (ARM Limited, Cambridge, England, UK) and Atmel AVR32 media processors (Atmel Corporation, San Jose, Calif.); digital signal processing ("DSP") chips, such as TI DaVinci series DSPs (Texas Instrument, Dallas, Tex.) and Analog Devices Shark or Blackfin DSPs (Analog Devices, Cambridge, Mass.); Freescale i.MX multimedia applications processors (Freescale Semiconductors, Inc., Austin, Tex.); field-programmable gate arrays ("FPGA"); and application specific integrated circuits ("ASIC").

Figure 1B:
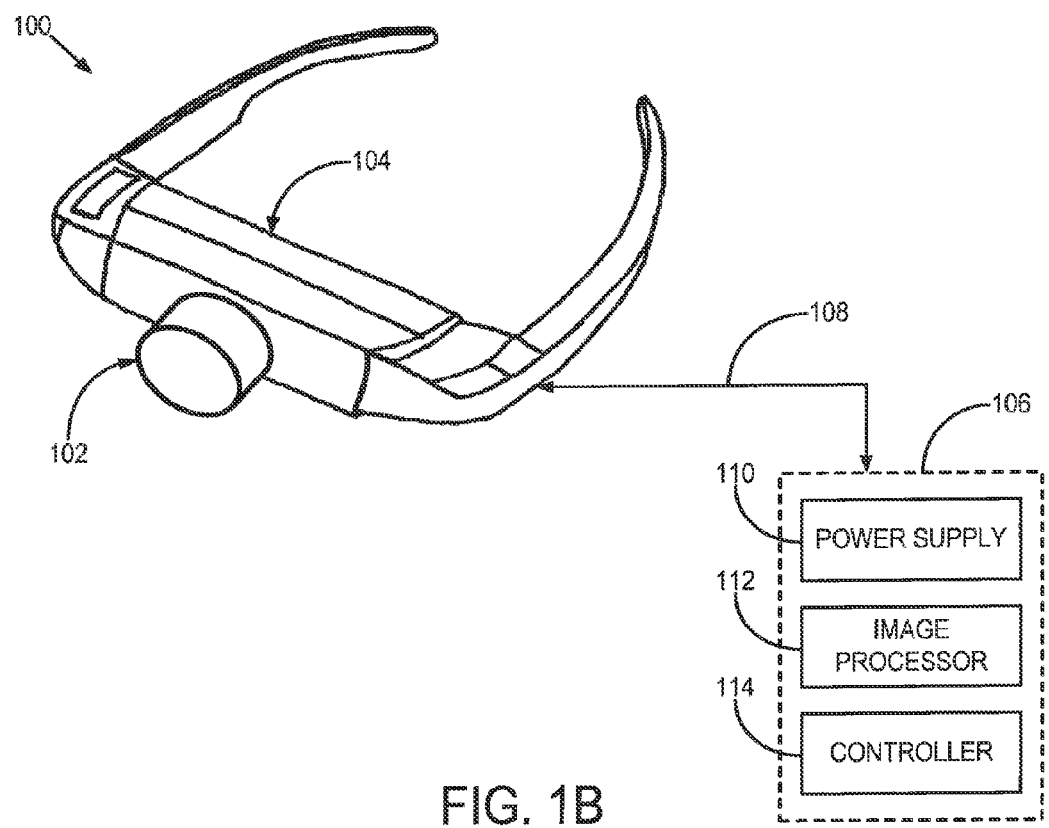
FIG. 1B depicts an alternate configuration of the imaging system of FIG. 1A, in which image processing hardware is located remotely from the imaging system.

The foregoing components are held in relative position to one another, and are protected from the outside environment, by the display housing 104. In an alternate configuration, and referring particularly now to FIG. 1B, the image processing and control hardware are located in a remote control housing 106 that is in communication with the display housing 104 through a cable 108. In such a configuration, the cable 108 supplies the output of the image array (not shown) to the image processor 204. Likewise, the output of the image processor 204 is communicated back to the display device (not shown), which is contained in the display housing 104. The cable 108 also supplies power for the image array (not shown) and display device (not shown). Preferably, the remote housing 106 is a small enclosure that can be worn, for example, in a shirt pocket.

While an exemplary imaging system has been presented for utilization when practicing the present invention, other alternative imaging systems can also be readily adapted to employ the present invention. For example, a vision system such as an AN/PVS-14 monocular night vision device can be utilized when practicing the present invention with the appropriate modifications to the image processing capabilities thereof. It should also be appreciated by those skilled in the art that the aforementioned imaging system can be operated to acquire images sensitive to two separate spectral ranges of light. For example, the imaging system can be adapted and configured to acquire images over mid to long infrared wavelengths for thermal imaging. In such an application, a second dedicated imaging array 200 for imaging the second spectral range can be employed. In this manner, images over the separate spectral ranges can be acquired, processed, and presented to the user, or, in the alternative, the images can be combined to provide a fusion image.

Image Processing

Figure 3:
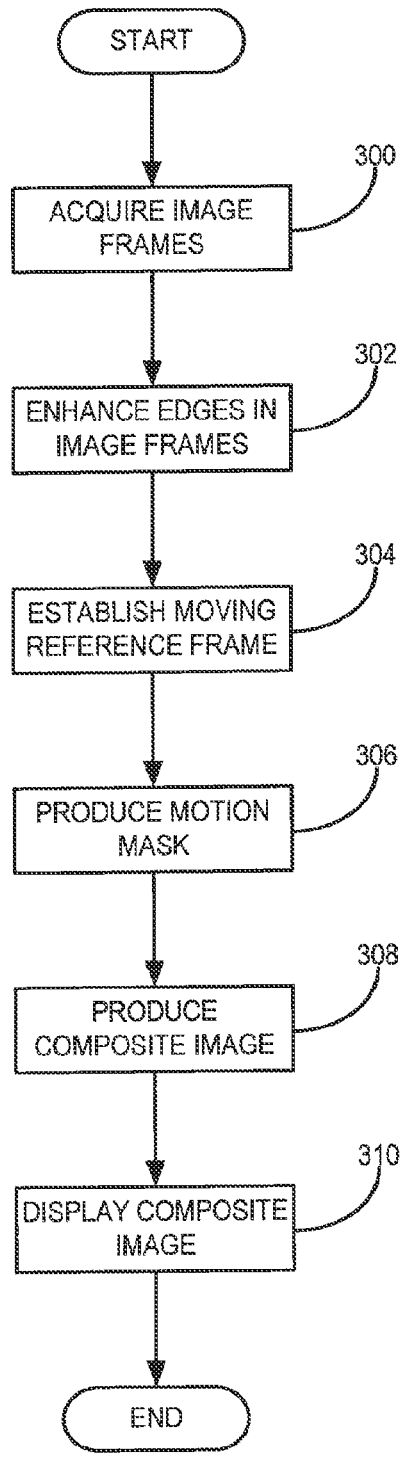
FIG. 3 is a flowchart setting forth the steps performed in accordance with the present invention to process image frames produced by the imaging system of FIG. 1A.

Referring particularly to FIG. 3, the imaging system described above is under the control of the system controller 210, which operates as directed by a stored program. This stored program periodically acquires an image frame, $I_k$, from the image array 200, as indicated by process block 300. The image frame, $I_k$, is in the form of a two-dimensional array of pixel magnitude values, for example, a 640×480 element array. As will become apparent from the description below, this acquired image frame, $I_k$, is processed according to the present invention and another image frame, $I_{k+1}$, is acquired and the process repeated. Image frames are acquired and processed at a high enough frame rate that the resulting series of displayed images depict continuous movement of the subject captured in the imaging system's field of view.

Referring still to FIG. 3, the first step in the processing of each acquired image frame, $I_k$, is to filter the image frames received from the image array 200 in order to enhance their edge detail, as indicated at step 302. This is effectively a high-pass filtering operation that is performed to improve the accuracy of the subsequent registration of successive image frames. First, a current image frame is convolved with a filter kernel to produce a convolved image frame. An exemplary filter kernel is a 20×20 square kernel. The convolved image frame is then subtracted from the original image frame to produce an edge enhanced image frame. This process is repeated for each image frame communicated to the image processor 204 from the image array 200. In general, the edge enhancement of the image frames is carried out so that significant changes in contrast from one image frame to the next is not improperly confused as motion within the field-of-view ("FOV"). This is particularly relevant when the image frames correspond, for example, to medical images acquired during a contrast enhanced x-ray fluoroscopy procedure.

After the image frames have been filtered to enhance their edge detail, a moving reference frame is established from the image frames, as indicated at step 304. The moving reference frame corresponds to motion of the imaging system FOV, such as, for example, head motion or vehicle motion. For example, if a user is wearing a "goggle system" such as the one described above with respect to FIG. 1A, then when the user moves their head from side to side, this "panning" of the imaging system FOV is established as the moving reference frame. An exemplary method for establishing this moving reference frame is detailed below with respect to FIG. 4. Alternately, when the imaging system includes, for example, an integrated accelerometer, signals from the accelerometer are communicated to the image processor to supplement or replace the calculation of a global shift vector indicative of the bulk motion of the imaging system.

Subsequently, a motion mask is produced using the image frames, as indicated at step 306. The motion mask, $M_k$, includes pixel locations in the corresponding image frame, $I_k$, that correspond to motion that is occurring within the image scene. For example, if the FOV corresponds to an image scene in which an animal is running across a street at night time, the motion of the animal is identified across image frames and the pixels in each image frame that correspond to the animal are placed in the motion mask. An exemplary method for producing a motion mask is detailed below with respect to FIG. 5.

Figure 6A:
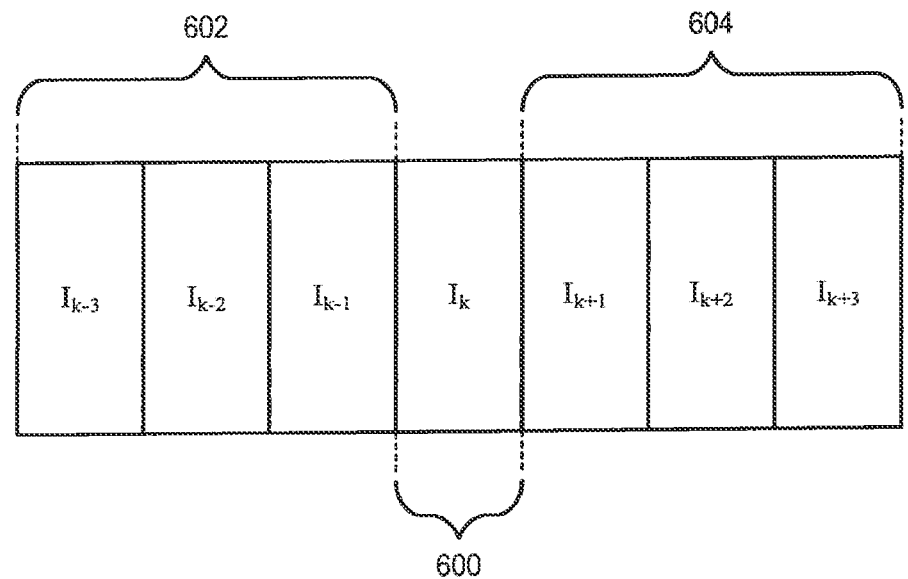
FIG. 6A is a pictorial representation of a single decay constant bi-directional recursive frame integration filter employed when practicing the method illustrated in FIG. 3.
Figure 6A:
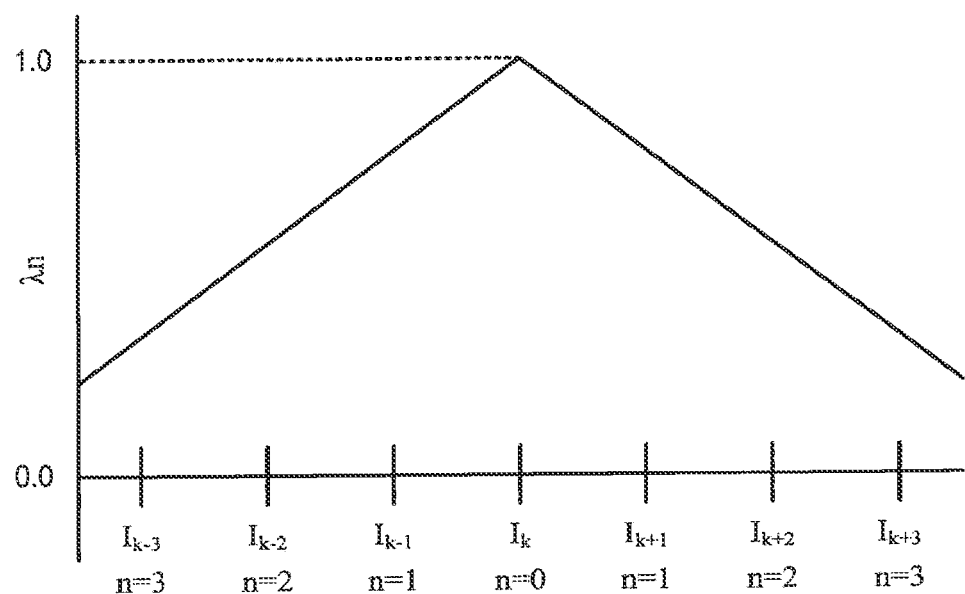

After the moving reference frame has been established and the motion mask produced, a composite image is produced for presentation to the user, as indicated at step 308. A bi-directional truncated recursive filter is employed to produce the composite image. Referring now to FIG. 6A, an exemplary bi-directional recursive filter utilizes a "current" image frame 600, $I_k$, three previous image frames 602 ($I_{k-3}, I_{k-2}, I_{k-1}$) acquired before the current image frame 600, $I_k$, and three image frames 604 ($I_{k+1}, I_{k+2}, I_{k+3}$) acquired after the current image frame, $I_k$, to produce a composite image of the current image frame, $C_k$, that will be displayed to the user. It should be appreciated by those skilled in the art that more or less time frames can be employed, for example, only one previous image frame, $I_{k-1}$, and one subsequent image frame, $I_{k+1}$, may be employed. Additionally, the number of previous image frames and subsequent image frames employed need not be equal. For example, only one subsequent image frame, but five previous image frames can be employed. For an additional increase in SNR, previously produced composite image frames can be utilized in lieu of previously acquired image frames; however, this will present a trade-off in the increase in SNR and latency in the displaying of the current composite image frame to the user.

The selected image frames are co-registered and weighted using a decay constant to produce the composite image, $C_k$, corresponding to the current image frame, $I_k$. This recursive filter is performed on a pixel-by-pixel basis as follows:

$$C_k(x, y) = I_k(x, y) + \sum_{n=1}^{n=3} (n\lambda) \cdot (\tilde{I}_{k-n}(x, y) + \tilde{I}_{k+n}(x, y)); \quad \text{Eqn. (1)}$$

and when previous composite image frames are utilized in lieu of previous image frames:

$$C_k(x, y) = I_k(x, y) + \sum_{n=1}^{n=3} (n\lambda) \cdot (\tilde{C}_{k-n}(x, y) + \tilde{I}_{k+n}(x, y)); \quad \text{Eqn. (2)}$$

where $C_k(x,y)$ is the value of the current composite image, $C_k$, at the pixel location (x,y); $I_k(x,y)$ is the value of the current image frame, $I_k$, at the pixel location (x,y); $\lambda$ is a decay constant; $\tilde{I}_{k-n}(x,y)$ is the value of the $n^{th}$ previous image at the pixel location (x,y) that has been registered with the current image frame, $I_k$; $\tilde{C}_{k-n}(x,y)$ is the value of the $n^{th}$ previous composite image at the pixel location (x,y) that has been registered with the current image frame, $I_k$; and $\tilde{I}_{k+n}(x,y)$ is the value of the $n^{th}$ succeeding image frame at the pixel location (x,y) that has been registered with the current image frame, $I_k$. The registration of the previous image frames and the proceeding image frames is performed using the shift values calculated when establishing the moving reference frame in step 304 above and using shift values corresponding to motion that occurs within the image scene, as described below with reference to FIG. 7. For example, the image intensity value at the pixel location (x,y) for the registered $n^{th}$ succeeding image frame, $\tilde{I}_{k+n}(x,y)$, is determined as follows:

$$\tilde{I}_{k+n}(x_k,y_k) = I_{k+n}(x_{k+n}+\Delta x_{k+n}+\delta x_{k+n}, y_{k+n}+\Delta y_{k+n}+\delta y_{k+n}) \quad \text{Eqn. (3)}$$

Where $\Delta x_{k+n}$ and $\Delta y_{k+n}$ are the global shift values for the $n^{th}$ succeeding image frame determined above in step 304 and $\delta x_{k+n}$ and $\delta y_{k+n}$ are the local shift values indicative of motion occurring within the $n^{th}$ succeeding image frame, as determined below with reference to FIG. 7. The application of these displacements serve to register the pixel value at pixel location ($x_{k+n}, y_{k+n}$) in the $n^{th}$ succeeding image frame, $I_{k+n}$, to the corresponding pixel location ($x_k, y_k$) in the current image frame, $I_k$. Similarly, the image intensity value at the pixel location (x,y) for the registered $n^{th}$ previous image, $\tilde{I}_{k-n}(x,y)$, is determined as follows:

$$\tilde{I}_{k-n}(x_k,y_k) = I_{k-n}(x_{k-n}+\Delta x_{k-n}+\delta x_{k-n}, y_{k-n}+\Delta y_{k-n}+\delta y_{k-n}) \quad \text{Eqn. (4);}$$

where $\Delta x_{k-n}$ and $\Delta y_{k-n}$ are the global shift values for the $n^{th}$ previous image frame determined above in step 304 and $\delta x_{k-n}$ and $\delta y_{k-n}$ are the local shift values indicative of motion occurring within the $n^{th}$ previous image frame, as determined below with reference to FIG. 7.

Figure 6B:
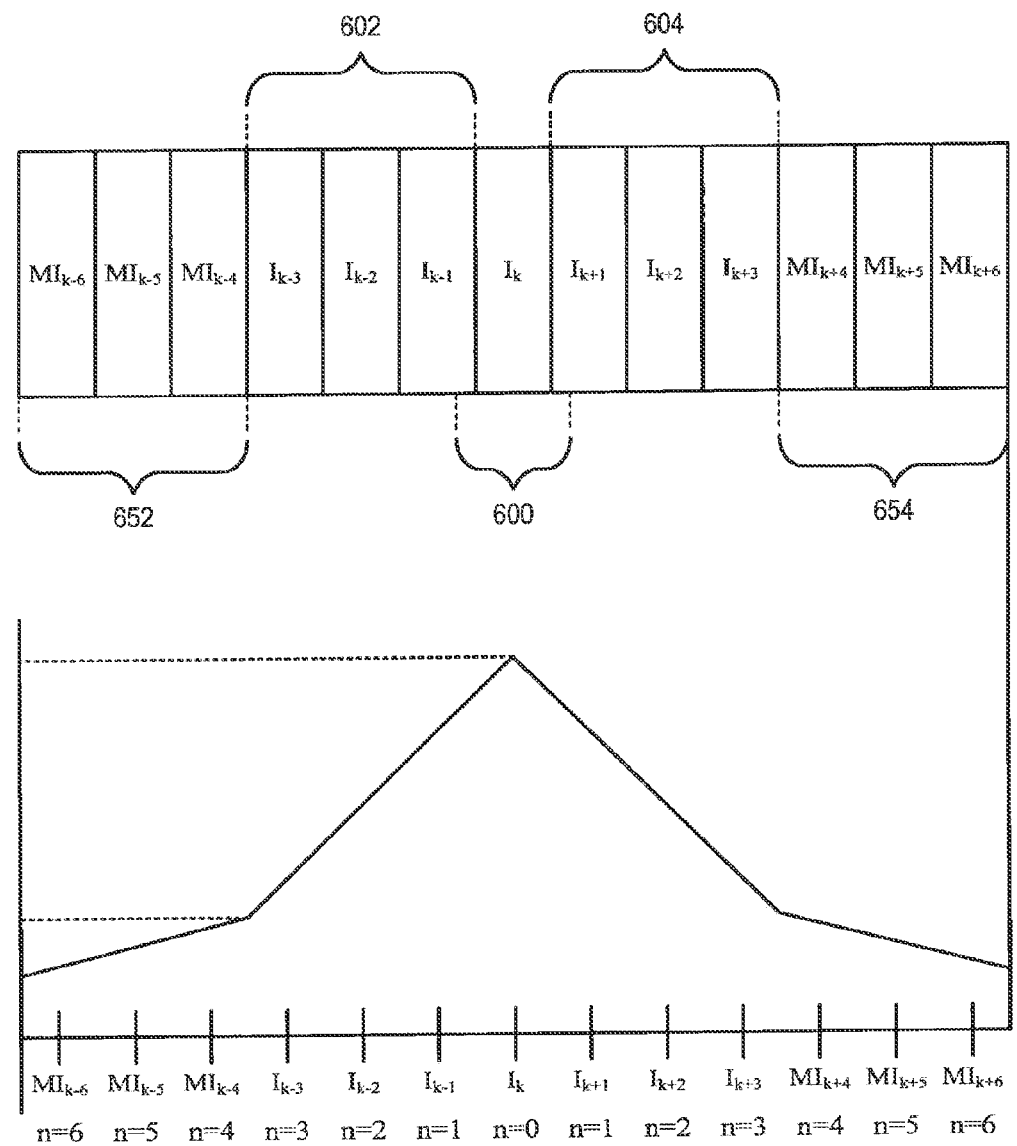
FIG. 6B is a pictorial representation of a two decay constant bi-directional recursive frame integration filter employed when practicing the method illustrated in FIG. 3.

The motion mask, $M_k$, produced above in step 306 can be employed during the production of the composite image, $C_k$, to allow more information of the static portion of the image scene to be included in the composite image to thereby provide a further increase in SNR. By way of example, and referring now to FIG. 6B, an exemplary bi-directional recursive filter utilizes a "current" image frame 600, $I_k$, three image frames 602 ($I_{k-3}, I_{k-2}, I_{k-1}$) acquired before the current image frame 600, $I_k$; three image frames 604 ($I_{k+1}, I_{k+2}, I_{k+3}$) acquired after the current image frame, $I_k$; three masked image frames 652 ($MI_{k-6}, MI_{k-5}, MI_{k-4}$) acquired before the image frame 600, $I_k$; and three masked image frames 654 ($MI_{k+4}, MI_{k+5}, MI_{k+6}$) acquired after the current image frame, $I_k$, to produce a composite image of the current image frame, $C_k$, that will be displayed to the user. The masked image frames are produced by multiplying the motion mask for the given time frame to the corresponding composite image frame or image frame for the same time frame. For example, the $n^{th}$ previous masked image frame, $MI_{k-n}$, is produced as follows:

$$MI_{k-n} = (1 - M_{k-n}) \cdot I_{k-n} \quad \text{Eqn. (5);}$$

where $M_{k-n}$ is the motion mask produced for the $n^{th}$ previous time frame and 1 is a matrix of ones having the same size as the motion mask, $M_{k-n}$. The selected image frames and masked image frames are co-registered and weighted using two decay constants to produce the composite image, $C_k$, corresponding to the current image frame, $I_k$. For example, a first decay constant, $\lambda_1$, is applied to the non-masked image frames 602 and 604, whereas a second decay constant, $\lambda_2$, is applied to the masked image frames 652 and 654. This recursive filter is performed on a pixel-by-pixel basis as follows:

$$C_k(x, y) = I_k(x, y) + \sum_{n=1}^{n=3} (n\lambda_1) \cdot (\tilde{I}_{k-n}(x, y) + \tilde{I}_{k+n}(x, y)) + \sum_{n=4}^{n=6} (n\lambda_2) \cdot (1 - M_{k-n}) \cdot (\tilde{I}_{k-n}(x, y) + \tilde{I}_{k+n}(x, y)); \quad \text{Eqn. (6)}$$

where, $\lambda_1$ is a first decay constant; $\lambda_2$ is a second decay constant; and, as above, $\tilde{C}_{k-n}(x,y)$ is the value of the $n^{th}$ previous composite image at the pixel location (x,y) that has been registered with the current image frame, $I_k$, and $\tilde{I}_{k+n}(x,y)$ is the value of the $n^{th}$ succeeding image frame at the pixel location (x,y) that has been registered with the current image frame, $I_k$.

It should be appreciated by those skilled in the art that the same decay constant can be employed for both $\lambda_1$ and $\lambda_2$. In addition, it should be appreciated that instead of weighting the masked imaged in Eqn. (6) by $n\lambda_2$, a uniform weighting can be applied as simply $\lambda_2$. Instead of masking image frames to isolate those regions that are substantially static, only those images that contain substantially no dynamic regions can also be utilized in the aforementioned process. For example, those image frames whose absolute value of displacement is under a threshold value can be included in the bi-directional recursive filter. Likewise, an ongoing sum of the shift values can be formed and the average of all previous frames whose absolute value of the displacement sum is under a threshold value can alternatively be utilized in the filter.

Referring again to FIG. 3, after a composite image has been produced, it is communicated to the display device 206 and displayed to the user, as indicated at step 310. While the composite image, $C_k$, can be displayed to the user as is, it can also be further processed before being communicated from the image processor 204 to the display device 206. Exemplary further processing includes weighting the composite image, $C_k$, by a blurred version of the corresponding current image frame, $I_k$. This blurred current image frame, $I_k^*$, is produced, for example, by convolving the current image frame, $I_k$, with a filter kernel. Exemplary filter kernels include a 7×7 or other sized square filter kernel, and a Gaussian and other smooth filter kernels. In general, the filter kernel should be on the order of the dimension of the objects being viewed or somewhat smaller. To weight the composite image, $C_k$, the blurred image frame, $I_k^*$, is multiplied by the updated composite image, $C_k$. This multiplication step is a straight forward multiplication of each pixel in the blurred image frame, $I_k^*$, by the corresponding pixel value in the composite image, $C_k$.

It should be apparent that the magnitudes of the pixel values in this weighted composite image do not accurately indicate the actual pixel values in the scene. If the actual pixel values are to be preserved, an additional normalization is added to the processing. This normalization step is performed by dividing the weighted composite image, $C_k$, by a blurred version of the composite image, $C_k$. The blurring of the composite image, $C_k$, is done in the same manner as that described above for blurring the image frame, $I_k$. While the normalization step preserves the actual pixel values in the weighted composite image, it adds considerable processing time which can unduly reduce the frame rate at which image frames can be produced.

Exemplary further processing of the composite image, $C_k$, also includes applying the motion mask produced above in step 306 to isolate and identify those pixels in the composite image that correspond to motion occurring within the image scene. The masking of the composite image, $C_k$, in this manner is performed in accordance with the following:

$$\hat{C}_k = (1 - M_k) \cdot C_k + M_k \cdot I_k \qquad \text{Eqn. (7);}$$

where $\hat{C}_k$ is the masked composite image, $M_k$ is the motion mask, and 1 is a matrix of ones having the same size as the motion mask, $M_k$. Thus, the pixels corresponding to motion within the image scene are removed from the current composite image, $C_k$, through multiplication by the static binary mask, $(1-M_k)$, and the pixels not corresponding to motion within the image scene are removed from the current image frame, $I_k$, through multiplication by the motion binary mask, $M_k$. These two intermediate images are then combined to produce the masked composite image, $\hat{C}_k$.

In this manner, the masked composite image, $\hat{C}_k$, can be viewed as having two channels: a motion channel corresponding to $M_k \cdot I_k$ and a static channel corresponding to $(1-M_k) \cdot C_k$. These two channels can be modulated to provide a unique contrast therebetween. For example, the static channel can be presented to the user using a gray scale color map while the motion channel can be presented to the user using a "red scale" color map so that those pixels corresponding to motion that has occurred within the image scene are highlighted as red in the masked composite image, $\hat{C}_k$.

When displaying the composite image, $C_k$, or masked composite image, $\hat{C}_k$, to the user, the influence of the image array 200 detector noise can be removed. A calibration step is performed, in which a plurality of image frames are acquired with the imaging system 100 while a lens cap covers the optical assembly, 102. For example, 50 image frames can be acquired in this manner. This arrangement is sufficient to characterize the inherent dark current and bias noise response of the image array 200. These "calibration" image frames are subsequently averaged and the result is stored in the system memory 214 as a "detector noise" map. This detector noise map is then subtracted from each image frame, $I_k$, prior to producing the composite image, $C_k$. It should be appreciated by those skilled in the art that a separate detector noise map can be produced for each unique set of settings utilized when operating the imaging system 100. In this manner, the detector noise map corresponding to a particular set of image system settings is subtracted from those image frames produced using the same settings.

The inherent dark current and bias noise of the image array 200 can additionally be characterized by exposing the image array 200 to an optical device such as a uniform intensity light source. An exemplary uniform intensity light source is a so-called integrating, or Ulbricht, sphere. This process results in the acquisition of a so-called uniform intensity image ("UII"). The UII is employed to produce a flat field image, for example, by subtracting the detector noise map from the acquired UII in order to compensate the UII for dark current and bias noise. When utilizing the additional characterization provided by the flat field image, after the detector noise map is subtracted from each image frame, $I_k$, the result is divided by the flat field image. In this manner, significant pixel structure noise is removed from the displayed composite image, $C_k$, or masked composite image, $\hat{C}_k$. As noted above, it should be appreciated by those skilled in the art that a unique detector noise map may be produced for a particular set of imaging system settings. To this end, a particular flat field image can also be produced for the same particular set of imaging system settings when the detector noise map corresponding to those settings is employed during the generation of the flat field image.

Figure 4:
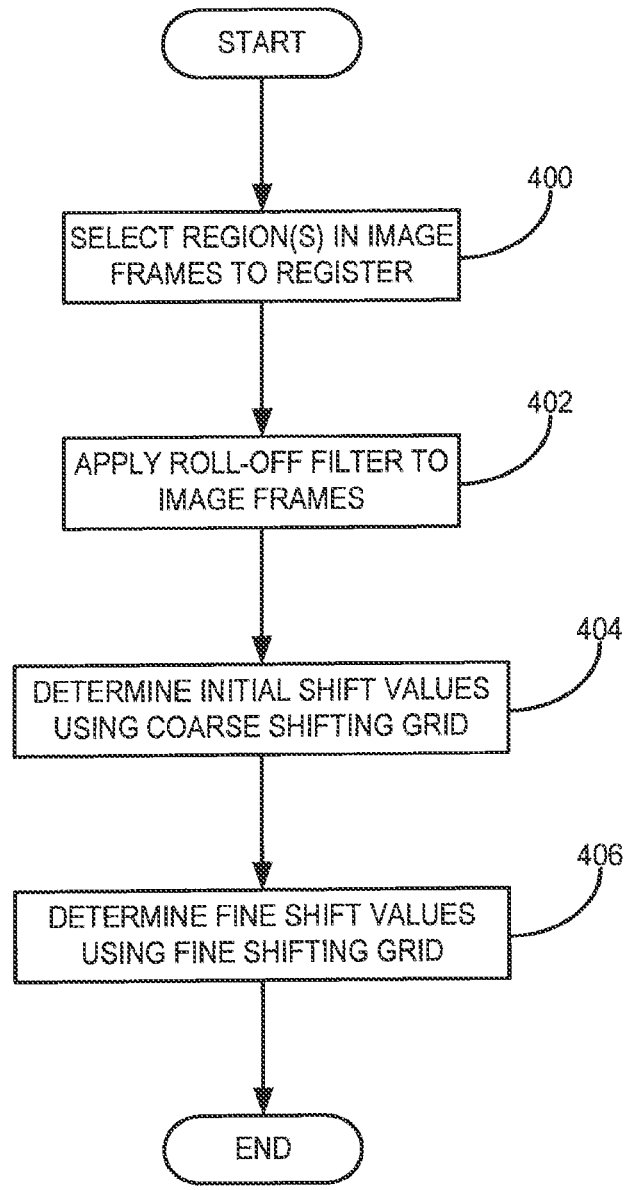
FIG. 4 is a flowchart setting forth the steps of an exemplary method for establishing a moving reference frame for the image system, which forms a part of the method illustrated in FIG. 3.

Referring now particularly to FIG. 4, an exemplary method for establishing a moving reference frame includes first selecting a region within the image frame field-of-view ("FOV") that is to be registered between successive image frames, as indicated at step 400. For example, a central region in the FOV may be selected or the central region of the FOV may be divided into four quadrants.

After the region that is to be registered has been selected, a roll-off filter is applied to the image frames, as indicated at step 402. This filter is applied so that edge effects that occur when information enters or leaves the FOV in sequential image frames are mitigated, thereby maintaining accuracy in the registration process. An exemplary roll-off filter, $F_{roll-off}$, has the form:

$$F_{roll-off}(x, y) = e^{-\alpha\left(\left(x - \frac{N_x}{8}\right)^2 + \left(y - \frac{N_y}{8}\right)^2\right)}; \qquad \text{Eqn. (8)}$$

where $\alpha$ is constant defining the roll-off filter size, $N_x$ is the number of pixel columns in the image frame, $N_y$ is the number of pixel rows in the image frame, and $(x,y)$ indicates the pixel location in the image frame that is being filtered.

After the image frames have been filtered as described above, a gross panning correction is performed to determine initial motion shift values, as indicated at step 404. This is achieved by searching over a coarse shift grid. These motion shift values are indicative of the direction and amount of bulk motion in the FOV, thereby defining an initial "global shift vector". Such bulk motion is typically caused by movement of the image system, such as panning, from one image frame acquisition to the next.

This is done by determining the direction and distance that the current image frame, $I_k$, has shifted in position from the position depicted in the previously acquired image frame, $I_{k-1}$. A methodical search is made over a coarse grid in the previous image frame, $I_{k-1}$, for a region of pixel values that correspond to a central region of pixel values in the current image frame, $I_k$. The region of pixels is smaller than the image frames, but large enough to detect bulk motion of the subject. During the search the sum of the absolute differences between corresponding pixel values in the two regions is calculated for each candidate region location in the previous image frame, $I_{k-1}$. The region location which produces the lowest difference value is chosen and this yields the initial global shift vector, which indicates the amount and direction the subject has shifted within the field of view of the imaging system. Using this initial global shift vector, all of the pixels in the previous image frame, $I_{k-1}$, can be shifted in the direction needed to offset the bulk motion. In doing so, the previous image frame, $I_{k-1}$, is then said to be "registered" with the current image frame, $I_k$. However, a refined search is performed around this initial global shift vector to more accurately establish the moving reference frame.

As indicated above, a fine panning correction is performed next to determine more accurate motion shift values, as indicated at step 406. This is achieved by performing shifts on a fine shift grid around the initial shift values calculated above in step 404. Utilizing the initial shift values, a methodical search is performed over a fine grid in the previous image frame, $I_{k-1}$, for a region of pixel values that correspond to a central region of pixel values in the current image frame, $I_k$. As its name implies, the fine grid is finer than the coarse grid employed when determining the initial shift values; thus, a search is performed to find smaller regions of pixels in the current image frame, $I_k$, that correspond to pixels in the previous image frame, $I_{k-1}$. The result of this search is a set of shift values defining a global shift vector that describes how the overall scene has shifted from a previous image frame, $I_{k-1}$, and the current image frame, $I_k$. It is not important that these shifts be exact, since motion that occurs within the image scene, and therefore within in each frame, is subsequently determined. By establishing the moving reference frame, however, this subsequent search is made more efficient by providing an initial estimate of gross motion.

Figure 7:
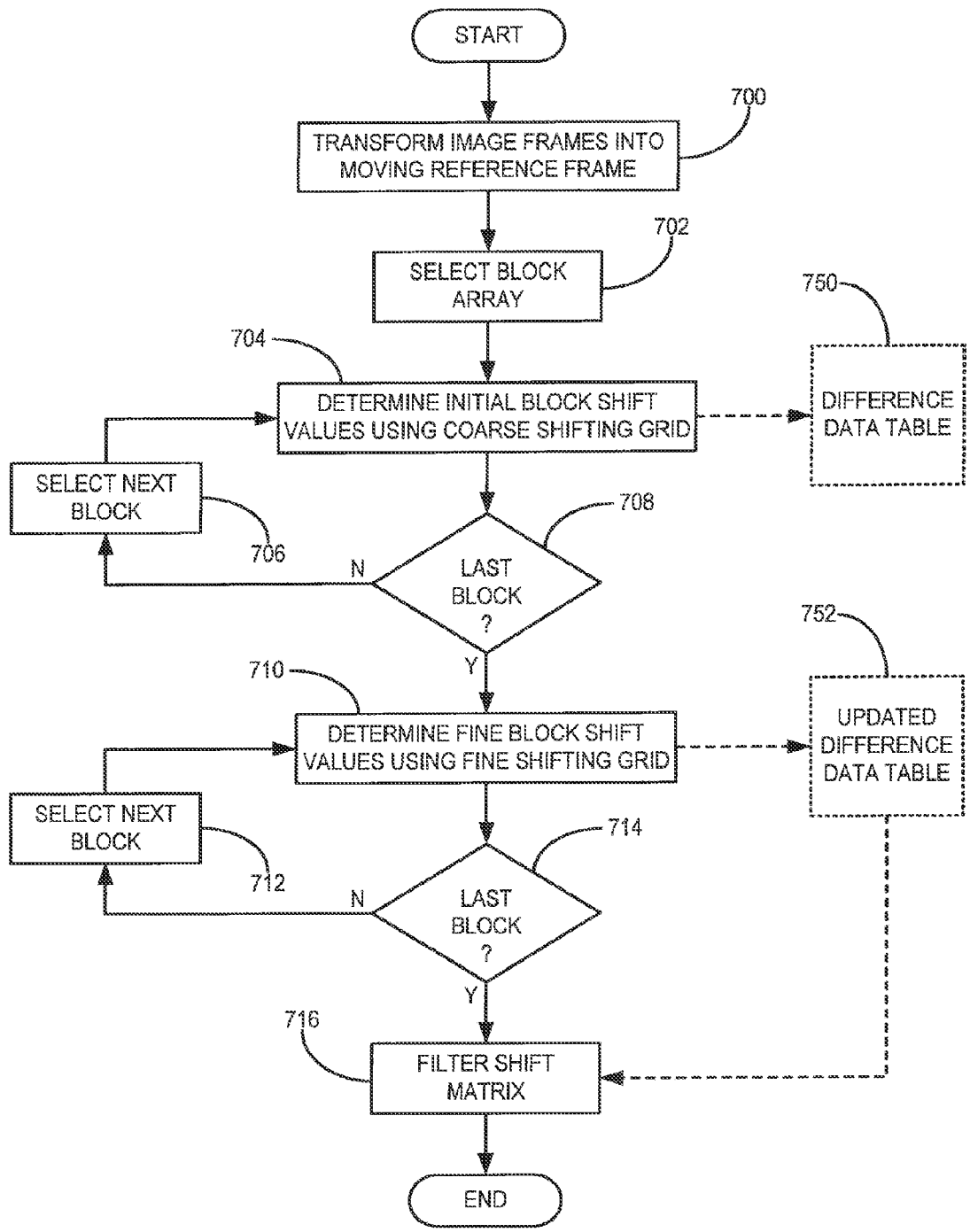
FIG. 7 is a flow chart setting forth the steps of an exemplary method for correcting an image frame for motion occurring within the image frame.

Referring particularly now to FIG. 7, an exemplary method for performing local motion corrections includes first transforming the acquired image frames into the moving reference frame established above in step 302, as indicated at step 700. As described above, this results in registering the image frames with each other, such as, for example, registering a previous image frame, $I_{k-1}$, with a current image frame, $I_k$. Thus, a loop is entered in which pixels in a previous image frame, $I_{k-1}$, that has been registered with a current image frame, $I_k$, are compared with that corresponding current image frame, $I_k$, in order to detect motion of objects within the FOV. This comparison is performed on a pixel-by-pixel basis; however, it can also be performed on a pixel-by-pixel basis only in those pixels where motion is detected through comparison of the sequential image frames.

In carrying this out, a block array in the sequential image frames is selected, as indicated at step 702. Exemplary block sizes within this block array are 8×8 or 10×10 pixels. A search is then performed in the registered previous image frame, $I_{k-1}$, within the selected block array for the location of the corresponding pixel in the current image frame, $I_k$, that is being processed. This is done by comparing the values of the pixels in the block surrounding the current pixel being processed in a manner similar to the comparison performed in step 404 described above.

Figure 8:
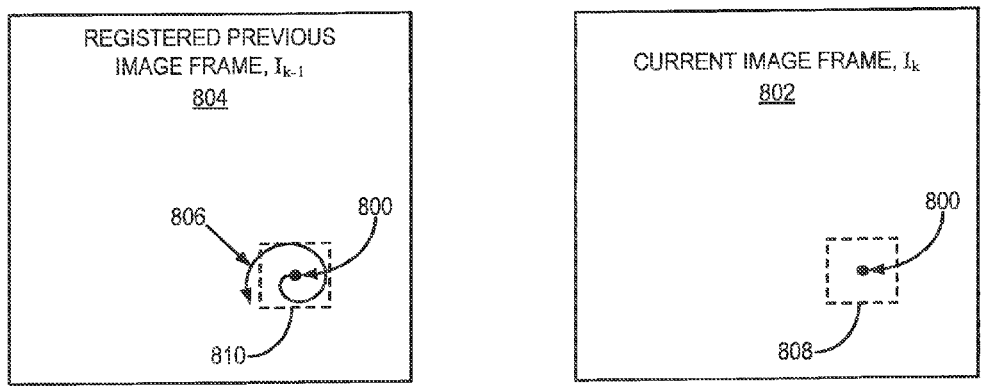
FIG. 8 is a pictorial representation of the processing performed in the method illustrated in FIG. 7.

By way of example, and referring particularly now to FIG. 8, a pixel 800 has a spatial location (x,y) in the current image frame 802, $I_k$, and if there is no subject motion, the same pixel value will be found at the same spatial location (x,y) 800 in the registered previous image frame 804, $I_{k-1}$. When motion occurs, however, the pixel value locations will be different and the objective is to locate the current image frame pixel in the registered previous image frame, $I_{k-1}$. As indicated by arrow 806, this is done by searching in a pattern around the corresponding pixel location 800 in the registered previous image frame 804. The size and shape of this search pattern will depend on the particular application.

Referring now to FIGS. 7 and 8, this search is conducted by comparing the pixel values in a region, or block, 808 surrounding the current image frame pixel 800 with the values in a similar displaced region 810 in the registered previous image frame 804, as indicated at step 704. For example, this comparison is performed by summing the absolute differences between corresponding pixel values in the two block 808 and 810 and storing the resulting "regions difference value" in a data table 750. The blocks 808 and 810 are each 8×8 pixels, although other block sizes, such as, for example 10×10 pixels may also be used depending on the particular application. This comparison step, 704, is repeated as indicated by process block 706, as the block 810 is moved around the registered previous image frame 804 in the prescribed search pattern 806 until the search pattern is completed, as indicated at decision block 708. Similar to the global motion calculated above in step 404, the results of this comparison is the determination of local shift values that define an initial local shift vector.

The size of the search pattern 806 will depend on the amount of anticipated subject motion from frame-to-frame, which in turn will depend on the particular application. Similar to the global motion correction previously performed, the foregoing local motion detection is repeated using a finer displacement grid on which the search pattern is performed, as indicated at step 710. As before, this comparison is performed by summing the absolute differences between corresponding pixel values in the two block 808 and 810 and storing the resulting "regions difference value" in an updated data table 752. This updated data table 752 includes a shift matrix, which relates the block shift values to the true pixel location shifts in (x,y)-coordinates. This finer local motion correction is subsequently repeated for each pixel location, as indicated at step 712 until the search pattern is completed, as indicated at decision block 714.

Because the image frames are inherently noisy, this noise can affect the calculated shift values, suggesting that there is motion where, in fact, no motion occurred. To mitigate such extraneous shift values, the shift matrix is filtered, as indicated at step 716. An exemplary filtering operation is achieved using a median filter.

Figure 5:
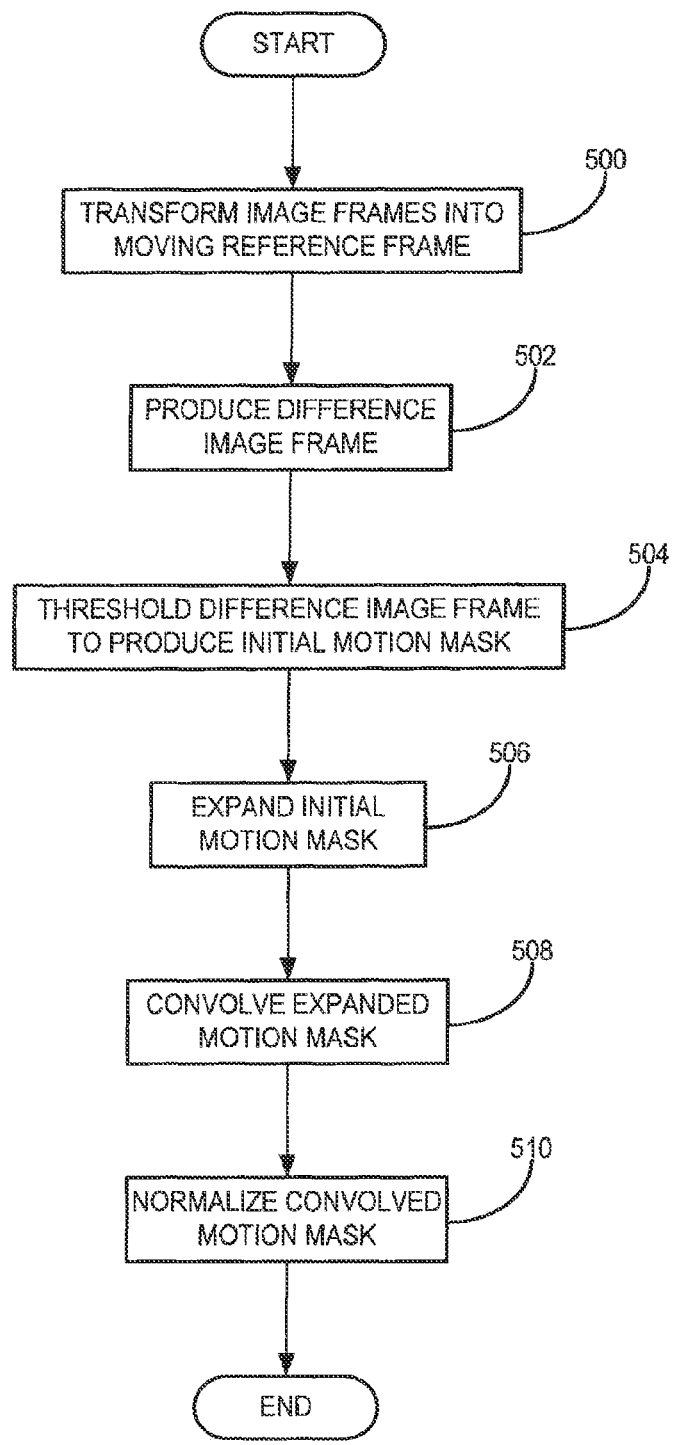
FIG. 5 is a flowchart setting forth the steps of an exemplary method for producing a motion mask, which forms a part of the method illustrated in FIG. 3.

Referring particularly now to FIG. 5, an exemplary method for producing a motion mask includes first transforming the acquired image frames into the moving reference frame established above in step 302, as indicated at step 500. An initial motion mask is then produced from pixels in a current image frame, $I_k$, that differ from the immediately previous image frame, $I_{k-1}$, thereby producing a difference image, as indicated at step 502. In the alternative, the initial motion mask is produced from pixels in the current image frame, $I_k$, that differ from an $n^{th}$ previous image frame, $I_{k-n}$, such as, for example, the third previous image frame $I_{k-3}$. The difference image is subsequently subjected to a thresholding process such that those pixel differences exceeding a preset fraction threshold are included in a binary motion mask, as indicated at step 504. An exemplary fractional threshold value is 20 percent. As mentioned above, for driving applications the motion corrections for motion occurring within the image scene are utilized across each image frame to compensate for parallax and the variable speed of objects moving within the image scene.

Because the central portions of moving objects may be fairly uniform from image frame to image frame, the initial motion mask will often contain pixels only from the leading and trailing edge of the moving object. Thus, in order to produce a motion mask that includes the entire moving object, the initial motion mask is expanded by temporal summation over a specified number of image frames, as indicated at step 506. It will be appreciated by those skilled in the art that other methods for expanding the initial motion mask can be employed, including a spatial dilation binary operation. The expanded binary mask is subsequently convolved to fill in potential undetected motion pixels, as indicated at step 508. The convolved motion mask includes non-unity values, and the pixel values in the mask fall off toward the edge of the mask as a result of the convolution. Therefore, the pixels in the convolved mask are normalized by dividing each pixel in the convolved mask by the maximum value in the convolved mask, as indicated at step 510. This provides a rolled off version of motion information when the current time frame information is multiplied by the motion mask and combined with information from the non-motion regions, as described above.

The present invention has been described in terms of one or more preferred embodiments, and it should be appreciated that many equivalents, alternatives, variations, and modifications, aside from those expressly stated, are possible and within the scope of the invention. While the present invention has been described in the context of a head-mounted camera application, such as a night vision device, it should be apparent that other applications are also possible. More particularly, the invention is applicable when a series of image frames are acquired and processed with a composite image that is produced using a bi-directional recursive filter during the acquisition of image frames, in which bulk motion of the scene within the FOV of each image frame is present along with detailed subject motions. Other such applications include video and medical imaging systems in which such bulk motion within the FOV is a concern. It should be appreciated by those skilled in the art that the present invention can be readily adapted to such exemplary alternate applications.

The invention claimed is:

1. A night vision device for providing images of a scene to a user, the night vision device comprising:
   an optical apparatus configured to receive light from the scene;
   an image array coupled to the optical apparatus and configured to:
      detect the light from the scene;
      produce a series of image frames of the scene using the detected light from the scene;
   an image processor in communication with the image array and configured to:
      receive, from the image array, the series of image frames of the scene;
      produce a series of filtered image frames by combining a currently produced image frame with at least one prior image frame produced prior to the currently produced image frame and at least one subsequent image frame produced subsequent to the currently produced image frame;
   a display device in communication with the image array and configured to:
      receive the series of filtered image frames from the image processor; and
      display the filtered image frames to the user.

2. The night vision device as recited in claim 1 in which the image processor is further configured to:
   determine, from the series of image frames, a moving reference frame indicative of motion of the night vision device; and
   correct each currently produced image frame in the series of image frames for motion of the imaging system using the determined moving reference frame.

3. The night vision device as recited in claim 2 further including an orientation detector coupled to the image processor and configured to:
   determine an orientation of the night vision device; and
   provide, to the image processor, a signal indicative of the determined orientation that is employed by the image processor to determine the moving reference frame of the night vision device.

4. The night vision device as recited in claim 2 further including a motion detector coupled to the image processor and configured to:
   determine motion of the night vision device; and
   provide, to the image processor, a signal indicative of the determined motion that is employed by the image processor to determine the moving reference frame of the night vision device.

5. The night vision device as recited in claim 1 in which the optical apparatus includes at least one of a monocular lens and a binocular lens.

6. The night vision device as recited in claim 1 in which the display device includes at least one of a light emitting diode display, an organic light emitting diode display, and a liquid crystal display.

7. The night vision device as recited in claim 1 in which the image array includes at least one of a charge coupled device, a complimentary metal-oxide semiconductor, and a focal plane array.

* * * * *